United States Patent Office 3,338,763
Patented Aug. 29, 1967

3,338,763
GRANULATING PROCESS FOR PYROTECHNICS CONTAINING ORGANIC DYES AND VINYL RESINS
Joseph Kristal, deceased, late of Dover, N.J., by Renee Kristal, administratrix, Flushing, N.Y., and Everett D. Crane, Dover, and Burton Werbel, West Orange, N.J., assignors to the United States of America as represented by the Secretary of the Army
No Drawing. Filed May 3, 1965, Ser. No. 453,569
4 Claims. (Cl. 149—19)

ABSTRACT OF THE DISCLOSURE

Improved pyrotechnic compositions and processes of making therefor in granular and free-flowing form employing auramine hydrochloride, sodium bicarbonate, potassium chlorate, vinyl alcohol acetate resins, and either sulfur or sugar and asbestos powder, are mixed until suitable granules of the pyrotechnic are formed.

---

The invention described herein may be manufactured and used by or for the Government for governmental purposes without the payment to us of any royalty thereon.

This invention relates to improved granulating and pelletizing processes. More particularly, the invention relates to an improved process for making both granules and consolidated tablets or pellets of pyrotechnic compositions containing finely divided ingredients.

The production of granules and pellets of finely divided compositions is of prime importance in the field of pyrotechnics. Such granules and pellets find major application in the manufacture of smokes, incendiaries, tracers, and fireworks and find varying use by both the military and the nonmilitary. The use of aggregates rather than fine powder is important where free flow characteristics are desired, for example, where subsequent process operations are envisioned, as in the manufacture of consolidated pellets.

However, processing techniques for the production of granules and pellets of pyrotechnic compositions containing finely divided ingredients, particularly those containing organic dyes, are attended by serious disadvantages. In the course of such production excessive amounts of dust are formed. The toxic nature of this dust presents a potential health hazard for operating personnel. Further, the large surface area and flammable nature of such dust presents an even greater potential fire and explosion hazard.

Prior art techniques for overcoming the disadvantages of excessive dusting have been complicated as well as costly. One such technique involves the operation known as "slugging," which comprises pressing a mass of finely divided composition into a form or mold, cracking the pressed mass into particles, and classifying useable particles by screening. This operation necessitates the employment of high pressure pressing apparatus as well as screening apparatus and requires a minimum of three essential process steps. Considerations of equipment, time, and labor in the slugging operation add appreciably to the overall cost of production of pyrotechnic granules and pellets. Also, attempts to make consolidated pellets from fine powders rather than granules not only results in dusting, but also when using equipment in which filling and consolidation is automatic, pellets result which are not uniform in height and density and which lack mechanical strength.

Accordingly, a principal object of the present invention is to provide an improved process for making consolidated pellets of pyrotechnic compositions unattended by the foregoing disadvantages of the prior art.

Another object of the invention is to provide a process for preparing free-flowing composition.

Another object of the invention is to provide an improved process for making pellets of pyrotechnic compositions containing finely divided ingredients, which process obviates the necessity of a slugging operation.

Still another object of the invention is to provide an improved process for making granules and pellets of pyrotechnic compositions containing finely divided ingredients, which process minimizes harmful dusting.

Other objects and advantages of the invention will in part be obvious and in part appear hereinafter in the following description of the invention and its embodiments.

The present invention involves the admixture of a liquid form of a binding agent with pyrotechnic compositions containing finely divided ingredients. The preferred binding agent is vinyl alcohol acetate resin and may be conveniently handled in a solution of a suitable solvent such as methyl acetate. Incorporation with pyrotechnic compositions to form desired granules may be effected in a typical counter current batch mixer. While the amount of binding agent admixed with a pyrotchnic composition may range from an amount effective for pyrotechnic purposes to a maximum of about 10 percent by weight, it has been found that a preferred range is 3 to 10 percent by weight and an optimum range is 6 to 10 percent by weight. Practice of the inventive granulating and subsequent pelletizing process eliminated completely the necessity of a slugging operation and the disadvantages incident thereto and provided an adequate solution to the problem of excessive dusting.

In the course of the investigation leading to the present invention various pyrotechnic compositions were formed into granules and consolidated pellets. Illustrative of such compositions or formulations are the following:

|  | Ex. 1 (percent by wt.) | Ex. 2 (percent by wt.) |
|---|---|---|
| Auramine Hydrochloride | 36.8 | 45.0 |
| Sodium Bicarbonate | 30.5 | 4.0 |
| Potassium Chlorate | 21.3 | 22.0 |
| Sulfur | 8.2 |  |
| Vinyl Alcohol Acetate Resin, solids | 3.2 | 9.0 |
| Sugar, Confectionary |  | 18.0 |
| Asbestos Powder |  | 2.0 |

The inventive procedure was employed in producing granules and consolidated pellets of the above formulations. Accordingly, the vinyl alcohol acetate resin in a solution of methyl acetate and diluted with ethyl alcohol was added to the dyestuff, auramine hydrochloride, and the sodium bicarbonate. The resultant mass was placed in a typical counter current batch mixer and allowed to incorporate for a short period of time, about one minute. Thereafter, the other ingredients were added and the entire mass was allowed to incorporate until large granules were formed. After drying and forcing the granules through a screen, consolidated pellets were manufactured on a Stokes type R press.

It is recognized that various changes may be made to the process of this invention, and that ingredients other than those specifically described herein may be employed in its practice without departing from the spirit and scope of the invention. For example, different dyes as well as different fuels, including reducing agents, may be employed.

Having thus described our invention so that others skilled in the art may be able to understand and practice the same, we state that what we desire to secure by Letters Patent is defined in what is claimed.

We claim:

1. An improved process for making granules of pyrotechnic compositions comprising preparing a methyl acetate solution of about 3 parts by weight vinyl alcohol acetate resin, adding said solution to about 37 parts by weight auramine hydrochloride and about 31 parts by weight sodium bicarbonate, subjecting the resultant mixture to a mixing operation until incorporation is effected, adding to the resultant incorporated mixture about 21 parts by weight potassium chlorate and about 8 parts by weight sulfur, and continuing said mixing operation until granules are formed.

2. An improved process for making granules of pyrotechnic compositions comprising preparing a methyl acetate solution of about 9 parts by weight vinyl alcohol acetate resin, adding said solution to about 45 parts by weight auramine hydrochloride and about 4 parts by weight sodium bicarbonate, subjecting the resultant mixture to a mixing operation until incorporation is effected, adding to the resultant incorporated mixture about 22 parts by weight potassium chlorate, about 18 parts by weight sugar, and about 2 parts by weight asbestos powder, and continuing said mixing operation until granules are formed.

3. Process for making granules of a pyrotechnic composition comprising preparing a methyl acetate solution of about 3 to 9 parts by weight vinyl alcohol acetate resin, adding said solution to about 37 to 45 parts by weight auramine hydrochloride and about 4 to 31 parts by weight sodium bicarbonate, subjecting the resulting mixture to a mixing operation until incorporation is effected, adding to the resultant incorporated mixture about 21 to 22 parts by weight potassium chlorate, and about 8 to 20 parts of at least one member selected from the group consisting of sulfur, sugar and asbestos, and continuing said mixing operation until granules are formed.

4. A pyrotechnic composition in granular form made by the process of claim 3.

References Cited

UNITED STATES PATENTS 2,416,639  2/1947  Pearsall _____ 149—2
3,052,577  9/1962  Butler _____ 149—19

OTHER REFERENCES

Military Explosives TM9–1910 TO11A–1–34 Depts. of Army and Air Force, April 1955, pages 274–283, and 290.

BENJAMIN R. PADGETT, *Primary Examiner*.